June 13, 1944.　　　　J. SEGEL　　　　2,351,156
REGULATOR AUXILIARY
Filed Feb. 25, 1942　　　2 Sheets-Sheet 2
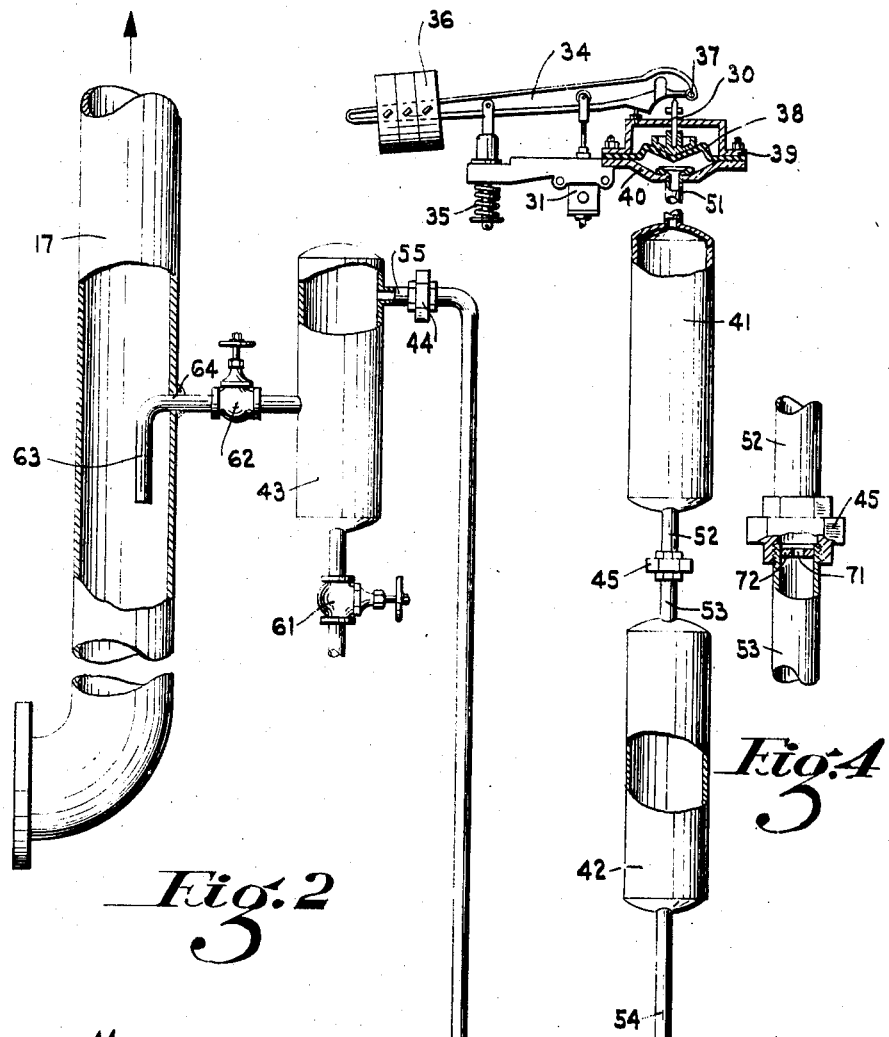
Joseph Segel INVENTOR
BY
ATTORNEY Patented June 13, 1944

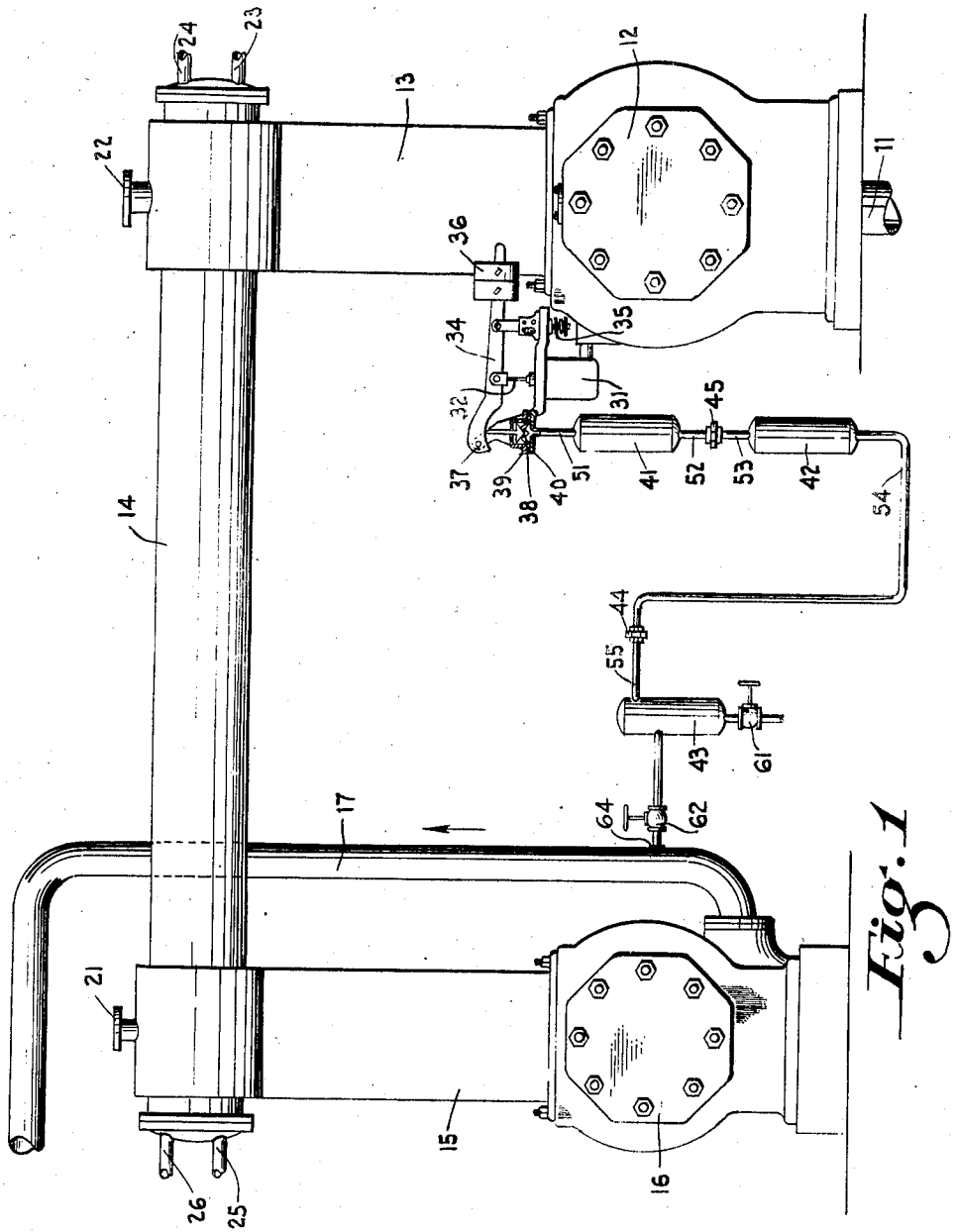

2,351,156

UNITED STATES PATENT OFFICE 2,351,156

REGULATOR AUXILIARY

Joseph Segel, Wilmington, Del., assignor to E. I. du Pont de Nemours & Company, Wilmington, Del., a corporation of Delaware Application February 25, 1942, Serial No. 432,283

4 Claims. (Cl. 230—21)

This invention relates to the compression of air and other gases, and especially to the operation of the compressors in such a way that constant pressure is maintained in the receivers. More particularly, it appertains to auxiliary attachments for compressor pressure (load-controlling) regulators.

In many of the industrial applications of compressed gases it is a desideratum that there be very little or no variation in the pressure. This is especially true in chemical plants using air or other gases under pressure directly in reactions. In pressure ammonia oxidation plants, for example, a constant pressure increases yields (conversion of ammonia to nitric oxides) and decreases loss of catalyst (platinum and related metals).

The motor driven compressors generally employed in these plants and other fields requiring pressure regulation, govern the pressure by varying the cylinder clearances, as pointed out in U. S. A. Patent No. 1,430,578 (Metzgar). Ordinarily the clearance changes are varied in steps, usually five in number, corresponding to no load, one-quarter load, one-half load, three-quarter load and full load. A regulator, operated by the pressure in the fluid receiver, controls valves connecting the cylinder to its clearance pockets. The regulators heretofore available have had operating characteristics requiring a change of approximately 2 p. s. i. in the air receiver pressure in order to shift the load by one step.

The primary object of this invention was to improve the regulation of air pressure in air receivers and in air compressor delivery lines. Other objects were to control the output of air compressors with small changes in compression delivery line pressure, to maintain a more nearly constant pressure in air receivers than was heretofore possible, and to improve the operation of conventional clearance valve regulators. A general advance in the art, and other objects which will appear hereinafter, are also contemplated.

It has now been found that connecting the discharge line of an air or other gas compressor with the diaphragm of a clearance control regulator in the manner described in detail hereinafter, overcomes the common objections heretofore encountered with this type of pressure control, and enables the compressor to deliver air at a rate which will maintain the receiver pressure substantially constant.

How the foregoing objects and related ends are accomplished will be apparent from the following exposition, in which are disclosed the principle and divers embodiments of the invention, including the best mode contemplated for carrying out the same. The written description is amplified by the accompanying drawings, in which:

Figure 1 is a diagrammatic elevation view of a two-stage air compressor embodying the pressure regulator auxiliary of this invention;

Figure 2 is an elevation view partly in section, of the apparatus connecting the pressure regulator diaphragm and the discharge line from the high pressure cylinder of an air compressor;

Figure 3 is an elevation view, partly in section, of a portion of the aforementioned connecting apparatus; and Figure 4 is an elevation view, partly in section, of a portion of the aforementioned connecting apparatus.

Referring now to Figure 1 of the drawings, there is shown in the lower right-hand corner at 11, the supply piping which connects the usual intake filter (not shown) and the low pressure cylinder 12 of an air compressor. A connection 13 delivers the compressed air from the cylinder 12 to an inter-cooler 14, which in turn furnishes the air, compressed to an intermediate stage, through the connection 15 to the high pressure cylinder 16. The compressed air delivered by the high pressure cylinder, passes through a discharge line 17 to an air receiver (not shown).

Connections for safety and unloading valves are provided on the inter-cooler at 21 and 22. Cooling water for the inter-cooler enters and leaves through the lines 23 and 24, and 25 and 26, respectively.

A pilot valve 31, connected by piping (not shown) with the clearance valves in the barrels or heads of the cylinders 12 and 16, is positioned by lever 34 through its stem 32. The opening and closing of these clearance valves (not shown) which connect the clearance pockets with the cylinder, is brought about by changes in air pressure which are governed by the pilot valve. When a clearance valve is open the volume of the clearance pocket which it controls is added to the normal cylinder clearance volume. The effect of this is to decrease the amount of air to be compressed which is taken into the corresponding end of the cylinder from the outside air. In order to enable the load on the compressor to be changed or controlled it is, therefore, only necessary to open or close the appropriate clearance valves. Air entrapped and compressed in a clearance pocket expands into the cylinder upon the return stroke of the piston. Usually the clearance pockets are cast integral with the cylinder barrel and are sufficient in volume to prevent new air from entering the cylinder during the suction stroke. In other words, while all of the pockets at one end of a cylinder are open, no air is taken into the cylinder. With this arrangement, compressed air can be supplied at a constant pressure by varying the capacity of the cylinders themselves, instead of employing such inefficient expedients as holding the valve in the inlet line open or exhausting excess compressed air to the atmosphere.

The operating mechanism for the pilot valve 31 comprises a lever 34, having a fulcrum at 37, and counter-balancing means including weights 36 and a tensioning device 35. The lever is operated by a post 30 connecting a knife edge assembly (near the fulcrum 37) and the diaphragm 38. The diaphragm 38 is maintained in position by annular clamping flanges 39 and 40.

The under side of this diaphragm is connected, by means of the regulator auxiliary of the present invention, to the line 17 connecting the discharge flange of the compressor to the receiver.

Changes in pressure on the lower side of the diaphragm, resulting from changes in pressure in the line 17, cause movement of the post operatively connected to the upper side. This movement is transmitted through the lever 34 to the pilot valve of the regulating system.

The novelty of the present invention resides principally in the receiver and orifice arrangement shown in considerable detail in Figure 2. This arrangement comprises receivers 41, 42 and 43, and orifices in connections 44 and 45. The receiver 41 is connected by piping 51 to the chamber under the diaphragm 38, and by piping 52 to the orifice connection 45, which in turn is connected by piping 53 to the receiver 42. Piping 54 joins the receiver 42 to the connection 44. A pipe 55 joins the orifice connection 44 and the receiver 43.

The receiver 43 has two other outlets, one through valve 61 to provide for oil drainage, and the other through valve 62 which connects with the compressor discharge line. The connection to the discharge line 17 preferably includes a Pitot tube 63. In some instances, for example, where adequate aftercooling is available, satisfactory results may be obtained without this tube. The connection with the valve 62 terminates at the welded connection 64 in such arrangements.

The orifices 71 and 81 can be constructed in any desired manner. One convenient method is to weld a disc, such as 72 or 82, in the end of the line pipe and drill an aperture of suitable diameter. Since the size of the orifice depends upon the pecularities of the particular compressor being controlled, the customary procedure is to drill small holes and enlarge these from time to time after operation has commenced, until the optimum aperture size has been found empirically. Access to these orifices is obtained through conventional piping unions.

The valve 62 is employed to cut off the line 17 from the remainder of the system for any desired purpose, such as repair work, blowing out the oil which has accumulated in the system, etc.

In one specific embodiment of the invention the lines 51, 52, 53, etc., were made of ¼ inch standard pipe, the connections 44 and 45 of standard ¼ inch unions, and the orifices 71 and 81 were initially drilled ⅛ inch. The receivers 41, 42 and 43 were made of 3 inch standard pipe about 9 inches long. The compressor operated at 110 pounds per square inch, and the delivery pipe was about 10 inches internal diameter. The diameter of the diaphragm in the regulator was approximately 8 inches.

Coming now to the operating features of the regulator, a definite pressure change therein is required to shift the compressor output. If there are no pulsations in the air pressure on the diaphragm, a pressure change of 2 p. s. i. is usually necessary before the regulator changes the compressor loading. This is a result of a certain amount of friction which is inherent in the conventional regulator and which prevents it from reacting to small changes in pressure. This friction is similar to the "break-away" friction of shafting (which is greater than the running friction).

It has been found that if a pulsating pressure is imposed on the diaphragm, the moving parts of the regulator never get set, and this "break-away" friction is absent. Less net change is diaphragm pressure is needed to reposition the regulator under such conditions, and the load control is improved.

Advantage is taken of this principle in this invention. In addition to this principle, the pressure imposed on the diaphragm is changed with the load on the compressor. This is brought by the auxiliary device connecting the control line into the discharge pipe of the compressor. As a result, the average diaphragm pressure changes immediately with a change in compressor load, and in the direction to return the diaphragm to its initial position.

If the compressor, for example, is operating at three-quarter load at 110 p. s. i. on the diaphragm, when the regulator shifts the compressor to full load the pressure on the diaphragm immediately rises to about, say 110.5 pounds, and the diaphragm is therefore already on the way to reduce loading to the three-quarter load point. This difference of about 0.5 pound represents the increased pressure drop through the discharge line 17 that occurs when the loading changes from three-quarters to full. By connecting the diaphragm to the discharge line, pulsations are imposed on the diaphragm. Either the normal pulsations (due to piston reciprocation) or the immediate pressure change with the load, may cause the regulator to "hunt" if there is no damping in the system. Hunting can be entirely eliminated by employing orifices and receivers in the line connecting the compressor discharge line and the diaphragm.

It is this arrangement which is illustrated in the drawing. The receiver 43 is designed to trap out the oil. The receivers 41 and 42, and associated orifices in the connections 45 and 44, reduce the pulsations to the degree desired. The number of orifices and receivers is regulated mainly by practical considerations, such as space and materials available, etc. Usually one nozzle or orifice followed by one receiver requires an unduly large receiver and undesirably small orifice to obtain a satisfactory effect. Actually, such an orifice is so small that stoppage by mill scale is quite possible. Doubling or otherwise multiplying the orifice-receiver combination allows larger orifices or nozzles to be used.

While there is no limit to the number of orifice-receiver units, the maximum will scarcely ever be more than four and usually not more than two. The volume of the receiver is varied directly with the size of the orifice. After final adjustment to suit the particular system, the diameter of the orifice is usually in the range one-sixteenth to three-sixteenths of an inch. The orifice dimensions and receiver capacities are independent of the pressures involved, being applicable to either low pressure or high (for example, 1000 atmospheres). The regulator systems of the present invention are used only on the discharge line of the last stage of the compressor (regardless of the number of stages), unless for some special reason it is desired to hold a constant pressure at some intermediate stage.

In the preferred embodiment, the connection into the compressor discharge line has an extension representing a Pitot tube; however, this is needed only if the discharge lines are short and there is less than full after-cooling. The Pitot tube effect is unnecessary where there is a long line including a full after-cooler between the compressor and the receiver.

It has been found that there is some variation in the operating characteristics of each different compressor system. A pressure regulating installation should be adapted to the particular pressure system with which it is employed. Adjustments are therefore necessary to compensate for the differences. These comprise enlarging the size of the orifices or decreasing the receiver effect if the regulation of the compressor is sluggish. If hunting is present, another orifice should be installed or the receiver size increased.

Since compressor regulation becomes progressively poorer as the load decreases, it is best to endeavor to secure operation in which the variation alternates only between the three-quarter and full load points.

The present system of improving compressor regulation is not limited to air compressors nor is it limited to compressors using clearance pockets to control pressure. If there is no sustained flow in the air regulating line, it is quite suitable for use for steam driven units. The arrangement of the present invention modifies the regulating pressure on the diaphragm of the commercial regulator, and is effective regardless of the type of regulator to which the movement of the diaphragm supplies the impetus, that is to say, the diaphragm need not position a pilot valve, but may position equivalent arrangements such as other mechanical devices and electrical devices. As will be apparent from the foregoing, the use of the novel regulator system does not extend beyond the diaphragm or Bourdon tube or other pressure sensitive element of commonly available regulators.

As many apparently widely different embodiments of this invention may be made without departing from the spirit and scope thereof, it is to be understood that this invention is not limited to the specific embodiments thereof except as defined in the appended claims.

I claim:

1. In combination with a regulator for controlling the gas supplied to a reservoir by a cylinder of a reciprocating gas compressor, said compressor having a discharge pipe extending between the exhaust port of the cylinder and the reservoir wherein the pressure pulsates above and below the mean pressure in the reservoir and wherein there is a drop in pressure between the cylinder and the reservoir, said regulator having a displaceable element which is responsive to gas pressure for actuating the regulator; means for diminishing the mean pressure change for actuating the regulator which comprises a fluid pressure conduit communicating at one end with said displaceable element and at the other end to the discharge pipe at a point where the pressure therein pulsates above and below the mean regulated pressure in the reservoir, said conduit having interposed between its ends at least one constriction forming an orifice therein and at least one enlargement forming a receiver therein for dampening the pulsations and anticipating changes in the the mean regulated pressure in the receiver due to changes in the loading of the compressor.

2. A device in accordance with claim 1 wherein the conduit has at least one orificed portion disposed between two receivers.

3. A device in accordance with claim 1 wherein the conduit has at least one receiver disposed between two orificed portions.

4. In combination with a regulator for controlling the gas supplied to a reservoir by a cylinder of a reciprocating gas compressor, said compressor having a discharge pipe extending between the exhaust port of the cylinder and the reservoir wherein the pressure pulsates above and below the mean regulated pressure in the reservoir, said regulator having a displaceable element which is responsive to gas pressure for actuating the regulator; means for diminishing the mean pressure change for actuating the regulator which comprises a fluid pressure conduit communicating at one end with said displaceable element and at the other end a Pitot tube mounted in the discharge pipe to face against the direction of flow of gas and at a point where the pressure in the discharge pipe pulsates above and below the mean regulated pressure in the reservoir, said conduit having interposed between its ends at least one constriction forming an orifice therein and at least one enlargement forming a receiver therein for dampening the pulsations and anticipating changes in the mean regulated pressure in the receiver due to changes in the loading of the compressor.

JOSEPH SEGEL.